US009461999B2

(12) United States Patent
Kai (10) Patent No.: US 9,461,999 B2
(45) Date of Patent: Oct. 4, 2016

(54) RELAY DEVICE
(75) Inventor: Toshifumi Kai, Osaka (JP)
(73) Assignee: Panasonic Intellectual Property Management Co., Ltd., Osaka (JP)
( * ) Notice: Subject to any disclaimer, the term of this patent is extended or adjusted under 35 U.S.C. 154(b) by 65 days.
(21) Appl. No.: 14/111,890
(22) PCT Filed: Apr. 20, 2012
(86) PCT No.: PCT/JP2012/060699
§ 371 (c)(1),
(2), (4) Date: Oct. 15, 2013
(87) PCT Pub. No.: WO2012/144591
PCT Pub. Date: Oct. 26, 2012

(65) Prior Publication Data
US 2014/0040996 A1 Feb. 6, 2014

(30) Foreign Application Priority Data
Apr. 20, 2011 (JP) ................. 2011-094289

(51) Int. Cl.
H04L 17/30 (2006.01)
H04L 29/06 (2006.01)
H04W 76/02 (2009.01)
H04W 84/04 (2009.01)

(52) U.S. Cl.
CPC ............. *H04L 63/10* (2013.01); *H04W 76/02* (2013.01); *H04W 84/047* (2013.01)

(58) Field of Classification Search
None
See application file for complete search history.

(56) References Cited

U.S. PATENT DOCUMENTS 7,529,219 B2  5/2009  Ishidoshiro
2007/0011262 A1*  1/2007  Kitani et al. ............... 709/213
2007/0294407 A1*  12/2007  Owen et al. ................ 709/226
2009/0129576 A1*  5/2009  Yamanashi et al. ..... 379/202.01

(Continued)

FOREIGN PATENT DOCUMENTS

JP          4480412         3/2010
JP      2010-278536 A      12/2010

(Continued)

OTHER PUBLICATIONS

International Search Report for corresponding International Application No. PCT/JP2012/060699 mailed Jun. 26, 2012.

Primary Examiner — Fatoumata Traore
(74) Attorney, Agent, or Firm — Renner, Otto, Boisselle & Sklar, LLP (57) ABSTRACT A connector 1 includes a connection request information reception processing unit 12 that obtains first connection request information transmitted by the first communication terminal and second connection request information transmitted by the second communication terminal, a connection request matching processing unit 151 that determines whether or not the first connection request information and the second connection request information obtained by the connection request information reception processing unit 12 form a combination under a predetermined condition, and a connection setting processing unit 15 that generates a connection permission message which includes connection information for a connection setting with the second communication terminal, depending on a determination result by the connection request matching processing unit 151 and transmits the connection permission message to the second communication terminal.

5 Claims, 9 Drawing Sheets (56) References Cited

U.S. PATENT DOCUMENTS

| | | | |
|---|---|---|---|
| 2010/0217990 A1* | 8/2010 | Abe | H04L 45/00 713/176 |
| 2011/0070903 A1* | 3/2011 | Honda et al. | 455/466 |
| 2011/0179167 A1* | 7/2011 | Tanimoto | H04L 12/4625 709/225 |
| 2011/0243058 A1* | 10/2011 | Yamada | 370/315 |

FOREIGN PATENT DOCUMENTS

| JP | 2012-070220 A | 4/2012 |
|---|---|---|
| WO | WO 2010/137584 A1 | 12/2010 |

* cited by examiner

CONNECTION REQUEST INFORMATION TABLE 81

| TERMINAL IDENTIFIER | CONNECTION REQUEST INFORMATION | RECEPTION NETWORK NUMBER |
|---|---|---|
| 10.0.0.2 | 2011/2/21 18:30:11 | 1 |
| 192.168.1.5 | 2011/2/21 18:30:14 | 2 |
| 192.168.1.8 | 2011/2/21 18:45:34 | 2 |
| 10.0.0.1 | 2011/2/21 18:45:34 | 1 |

FIG. 7

SECURITY POLICY TABLE 82

| APPROVED NETWORK NUMBER | APPROVED TERMINAL IDENTIFIER | TARGET NETWORK NUMBER | ACCESS PERMISSION POLICY | COMMUNICATION MESSAGE MONITORING POLICY |
|---|---|---|---|---|
| 1 | 10.0.0.1 | 2 | NETWORK 1 | NO MONITORING |
| 1 | 10.0.0.2 | 2 | TERMINAL 10.0.0.2 | MONITORING |
| 1 | * | 2 | NETWORK 3 | NO MONITORING |

FIG. 8

SECURITY SETTING TABLE 83

| TARGET TERMINAL IDENTIFIER | ACCESS PERMISSION | COMMUNICATION MESSAGE MONITORING |
|---|---|---|
| 192.168.1.5 | TERMINAL 10.0.0.2 | WITH MONITORING |
| 192.168.1.8 | NETWORK 1 | WITHOUT MONITORING |

FIG. 9

CONNECTION PERMISSION INFORMATION TABLE 84

| RECEPTION NETWORK NUMBER | TARGET TERMINAL IDENTIFIER | CONNECTION INFORMATION |
|---|---|---|
| 1 | * | ALL CONNECTION PERMITTED |
| 3 | * | ALL CONNECTION PERMITTED |
| 2 | 192.168.1.5 | 0x123456... |
| 2 | 192.168.1.8 | 0x987654... |

FIG. 10

CONNECTION PERMISSION MESSAGE 62

| TARGET TERMINAL IDENTIFIER | ACCESS PERMISSION | COMMUNICATION MESSAGE MONITORING | CONNECTION INFORMATION |
|---|---|---|---|

RELAY DEVICE

TECHNICAL FIELD

The present invention relates to a relay device which is easy to implement connection settings.

BACKGROUND ART

Conventional relay devices (Wireless Local Area Network router) which relay communications among a plurality of networks such as wired LAN, wireless LAN and WAN have the following two problems when relaying a communication from a communication terminal, which has a wireless LAN connecting function and is brought in from outside, to an arbitrary network or another communication terminal.

The first problem is related to connection settings. As a connection setting method for limiting terminals, which are capable of connecting to a wireless LAN, due to security reasons, there are two methods: one method is to input authentication information to a terminal; and another method is to implement a connection setting operation on both a relay device and a terminal at a right timing.

Input of authentication information is generally troublesome and needs a complex input device provided on the terminal for inputting authentication information including of numerical numbers, letters and the like. On the other hand, in the method for implementing a connection setting operation on both the relay device and the terminal at a right timing, the relay device and the terminal need to be installed at an easy place to operate (see Patent Literature 1). In order to implement a connection setting even though the relay device is installed at a difficult place to reach, such as ceiling, and the terminal has no complex input operation, it is required that a connection setting method enables an easy input operation without operating the relay device.

The second problem is related to security settings including access controls. When a communication terminal brought-in from outside is made to communicate with an arbitrary network or another communication terminal, there is a case of disabling communications with communication terminals or networks out of an original purpose due to security or privacy reasons. In this case, it is required that an access control setting is implemented on the relay device.

Implementation of conventional access control settings requires a work of identifying a terminal for which an access control is desired among terminals connected to the relay device by use of information on the network (IP address, MAC address, or the like) and setting an access control policy therefor. During this work, if the user forgets setting or fails to set, the access control is not implemented, thereby causing a security problem.

CITATION LIST

Patent Literature

[PTL 1]
Japanese Patent Publication No. 4480412

SUMMARY OF INVENTION

The present invention has an object to provide a relay device that is easy to implement connection settings without the need of operations therefor.

To accomplish the foregoing object, the gist of a first aspect of the present invention is a relay device which communicates with a first communication terminal and a second communication terminal, and relays a communication between the second communication terminal and an outer network, the relay device including: a connection request information reception processing unit that obtains first connection request information transmitted by the first communication terminal and second connection request information transmitted by the second communication terminal; a connection request matching processing unit that determines whether or not the first connection request information and the second connection request information obtained by the connection request information reception processing unit form a combination under a predetermined condition; and a connection setting processing unit that generates a connection permission message, which includes connection information for a connection setting with the second communication terminal, depending on a determination result by the connection request matching processing unit and transmits the connection permission message to the second communication terminal.

The relay device according to the first aspect of the present invention further includes: a security setting processing unit that determines a security setting, which is for controlling communications, regarding a communication message transmitted by the second communication terminal; and a routing processing unit that controls communications in accordance with the security setting determined by the security setting processing unit.

In the relay device according to the first aspect of the present invention, the routing processing unit monitors the communication message transmitted by the second communication terminal and determines whether or not the communication message is an illegal communication message.

The relay device according to the first aspect of the present invention further includes: a connection permission information storage unit that stores the connection permission message generated by the connection setting processing unit; a connection permission confirmation processing unit that refers to the connection permission information storage unit regarding the communication message transmitted by the second communication terminal and determines whether or not the second communication terminal is permitted to connect; and a connection permission reception processing unit that, when receiving a connection permission message from another relay device, stores the connection permission message received from another relay device, in the connection permission information storage unit.

The relay device according to the first aspect of the present invention further includes: a security setting processing unit that determines a security setting, which is for controlling communications, regarding a communication message transmitted by the second communication terminal; and a routing processing unit that controls communications in accordance with the security setting determined by the security setting processing unit, wherein the connection setting processing unit causes the security setting determined by the security setting processing unit to be included in the connection permission message, and the routing processing unit controls communications in accordance with the security setting stored in the connection permission information storage unit.

According to the present invention, the connection setting for the second communication terminal is performed on the basis of the first connection request information transmitted by the first communication terminal and the second connection request information transmitted by the second communication terminal. It is therefore possible to provide a relay device that is easy to implement connection settings without the need of operations therefore.

According to the present invention, there is no need of operating the relay device even for security settings for controlling communications regarding communication messages.

According to the present invention, it is possible to determine illegal communications by monitoring communication messages.

According to the present invention, even though there is a plurality of relay devices on a network, it is possible to set the same connection setting on the plurality of relay devices.

According to the present invention, even though there is a plurality of relay devices on a network, it is possible to set the same security setting on the plurality of relay devices.

DESCRIPTION OF EMBODIMENTS

Next, an embodiment of the present invention will be described with reference to the drawings. In the following description in the drawings, the same or similar reference sign is given to parts which are same or similar. The following embodiment illustrates a device and a method for embodying a technical idea of the present invention, and a system using them. The technical idea of the present invention is not however limited to the device and the method, and the system using them which are illustrated in the following embodiment. Various modifications may be added in the technical idea of the present invention within the technical range described in the scope of claims.

(Communication System)

Figure 1:
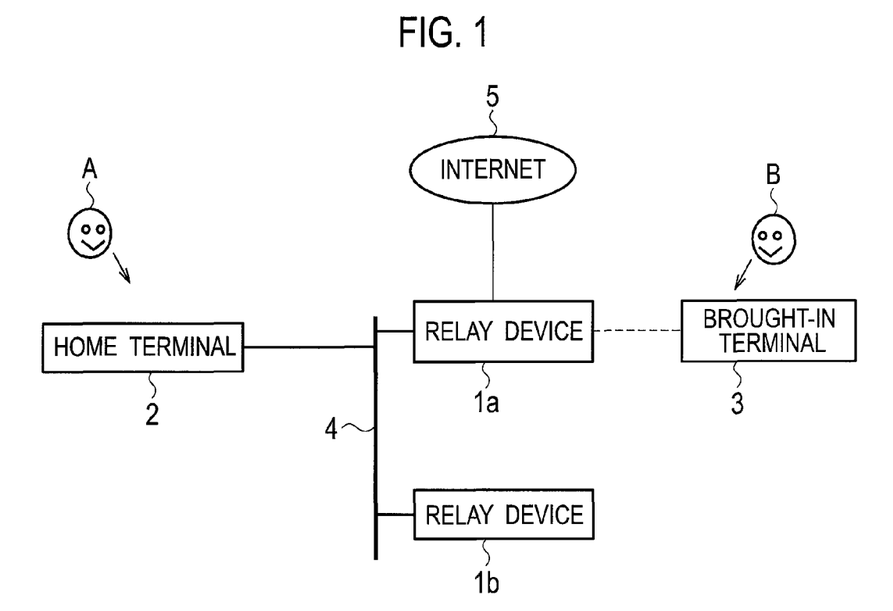
FIG. 1 is a schematic block diagram explaining a basic configuration of a communication system according to an embodiment of the present invention.

As shown in FIG. 1, a communication system according to an embodiment of the present invention includes a relay device 1*a* and a relay device 1*b* (hereinafter collectively called "relay device 1") which relay communications between communication terminals and the Internet 5 (outer network), and a home terminal 2 and a brought-in terminal 3 which are the communication terminals.

Figure 2:
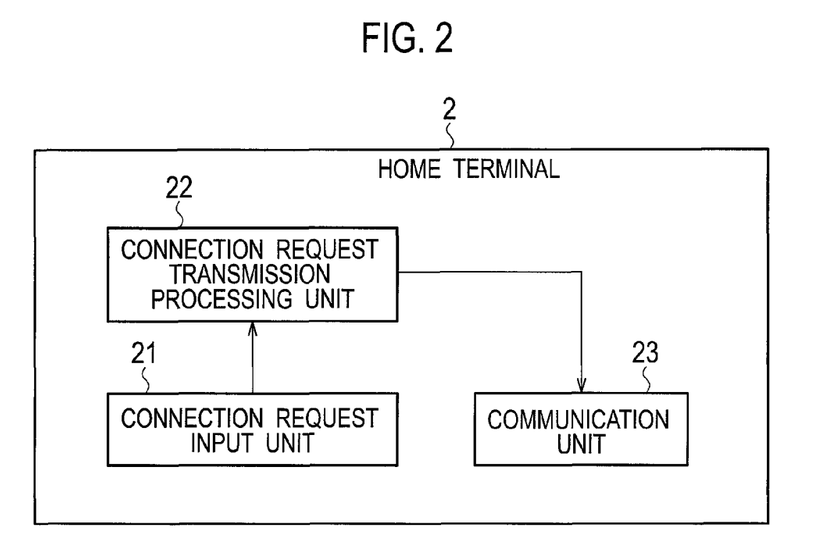
FIG. 2 is a block diagram explaining a home terminal included in the communication system according to the embodiment of the present invention.

As shown in FIG. 2, the home terminal (first communication terminal) 2 includes a connection request input unit 21, a connection request transmission processing unit 22 and a communication unit 23. The connection request input unit 21 is an input device such as various switches including buttons, a keyboard or the like, and receives an input of connection request information through an operation by a user A. The connection request transmission processing unit 22 generates a connection request message on the basis of the connection request information input to the connection request input unit 21 and makes the communication unit 23 transmit the generated message. The communication unit 23 is capable of communicating with the relay device 1 through a wired communication or a wireless communication.

Figure 3:
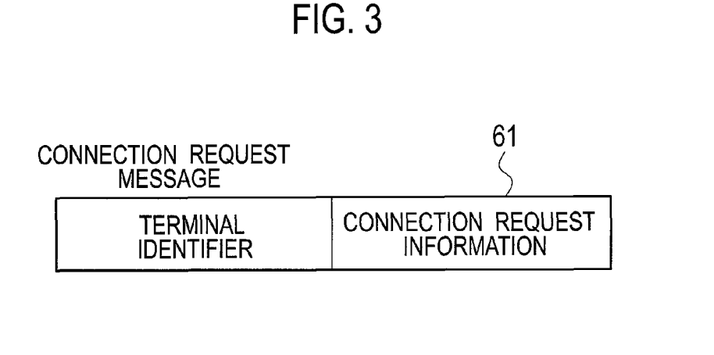
FIG. 3 is an example illustrating a data structure of a connection request message used in the communication system according to the embodiment of the present invention.

For example, as shown in FIG. 3, the connection request transmission processing unit 22 generates a connection request message 61 including a terminal identifier for identifying the home terminal 2 and connection request information input to the connection request input unit 21. The terminal identifier is, for example, an IP address, a MAC address or the like, which identifies the home terminal 2 on a network.

The home terminal 2 is a consumer electrical appliance such as a television or a recorder, a PC, or a communication terminal including a portable terminal, for example. In FIG. 1, the home terminal 2 is connected with the relay device 1*a* through a wired LAN 4. There may be a plurality of home terminals 2 and some of them may be connected with the relay device 1 through a wireless LAN. The home terminal 2 is allowed to access a server and the like on the Internet 5 through the relay device 1.

Figure 4:
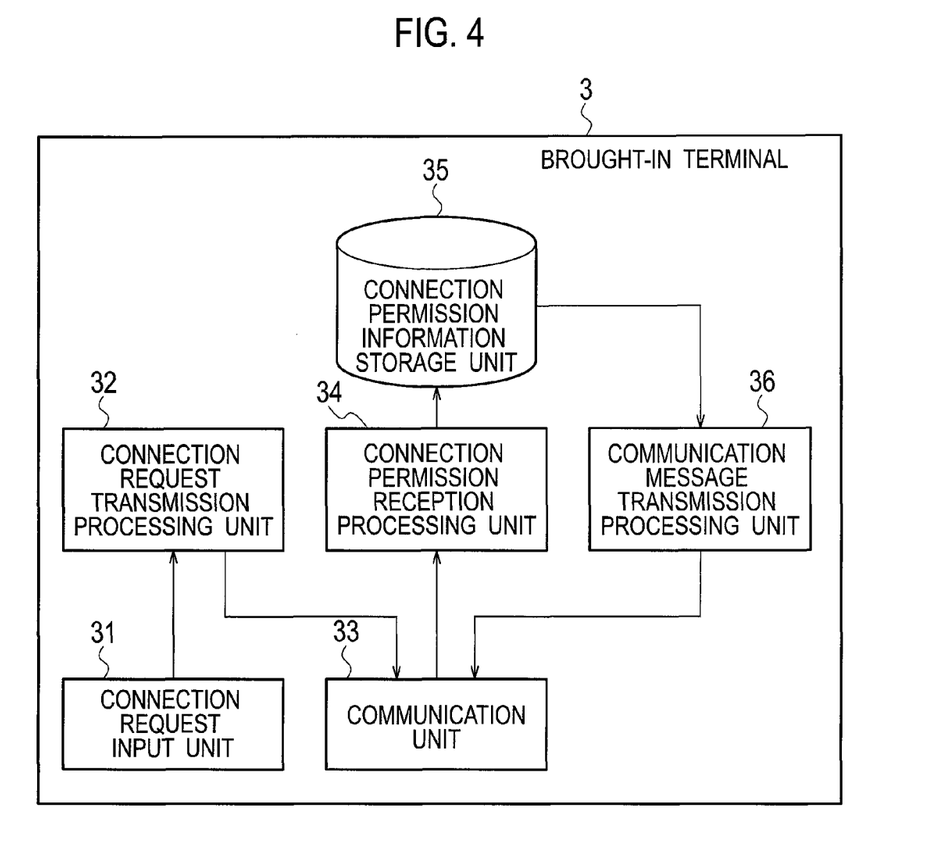
FIG. 4 is a block diagram explaining a brought-in terminal included in the communication system according to the embodiment of the present invention.

As shown in FIG. 4, the brought-in terminal (second communication terminal) 3 includes a connection request input unit 31, a connection request transmission processing unit 32, a communication unit 33, a connection permission reception processing unit 34, a connection permission information storage unit 35, and a communication message transmission processing unit 36. The brought-in terminal 3 is a communication terminal such as a portable terminal. The connection request input unit 31 is an input device such as various switches including buttons, or a keyboard, and receives an input of connection request information through an operation by a user B. The connection request transmission processing unit 32 and the communication unit 33 have substantially same configurations as the connection request transmission processing unit 22 and the communication unit 23 of the home terminal 2. Duplicated explanations are thus omitted.

The connection permission reception processing unit 34 makes the connection permission information storage unit 35 store the connection permission message which is transmitted by the relay device 1 and received by the communication unit 33 therein. The communication message transmission processing unit 36 makes the communication unit 33 transmit various communication data other than the connection request message on the brought-in terminal 3, as a communication message.

The connection request information is information for the relay device 1 to determine whether or not a connection request message of the home terminal 2 corresponds to a connection request message of the brought-in terminal 3. Information which is easy to input, such as a personal identification number or timing information of pressing a button, is adoptable as the connection request information.

Figure 5:
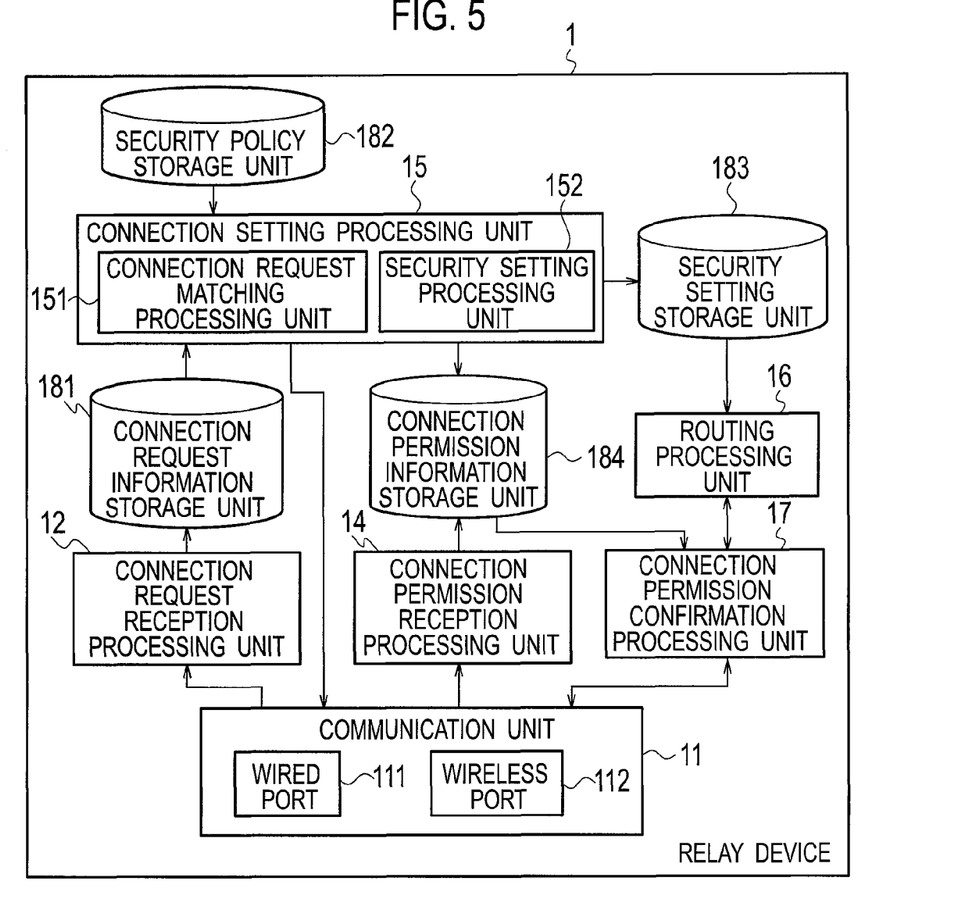
FIG. 5 is a block diagram explaining a relay device included in the communication system according to the embodiment of the present invention.

As shown in FIG. 5, the relay device 1 includes a communication unit 11, a connection request reception processing unit 12, a connection permission reception processing unit 14, a connection setting processing unit 15, a routing processing unit 16, and a connection permission confirmation processing unit 17. The relay device 1 further includes a connection request information storage unit 181, a security policy storage unit 182, a security setting storage unit 183 and a connection permission information storage unit 184.

The communication unit 11 includes a wired port 111 for a wired-connection communication with the home terminal 2 and the like through the wired LAN 4 etc., and a wireless port 112 for a wireless-connection communication with the home terminal 2, the brought-in terminal 3 and the like through a wireless LAN etc. Moreover, the wired port 111 may be connected to the Internet 5, so that the communication unit 11 interconnects the Internet 5, the home terminal 2 and the brought-in terminal 3 for communications thereamong.

Figure 6:
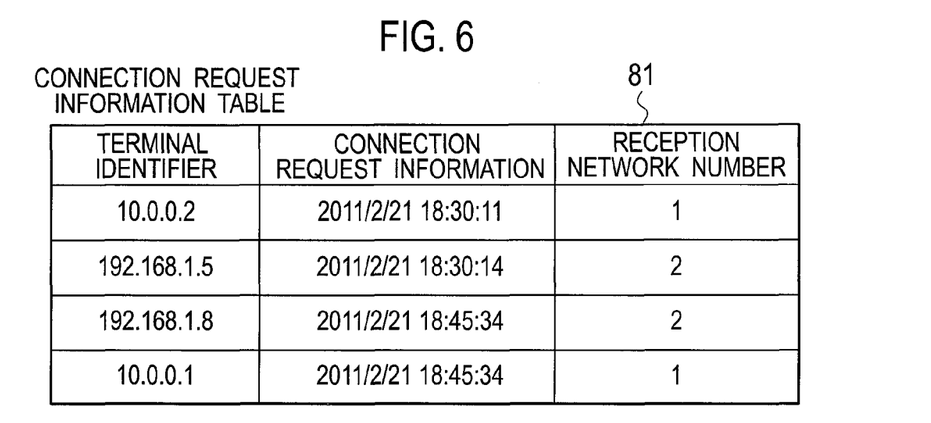
FIG. 6 is an example illustrating a connection request information table used in the communication system according to the embodiment of the present invention.

The connection request reception processing unit obtains connection request messages, which are transmitted by the home terminal 2 and the brought-in terminal 3 and received by the communication unit 11. For example, as shown in FIG. 6, the connection request reception processing unit 12 makes the connection request information storage unit 181 store the obtained connection request messages as a connection request information table 81.

Figure 7:
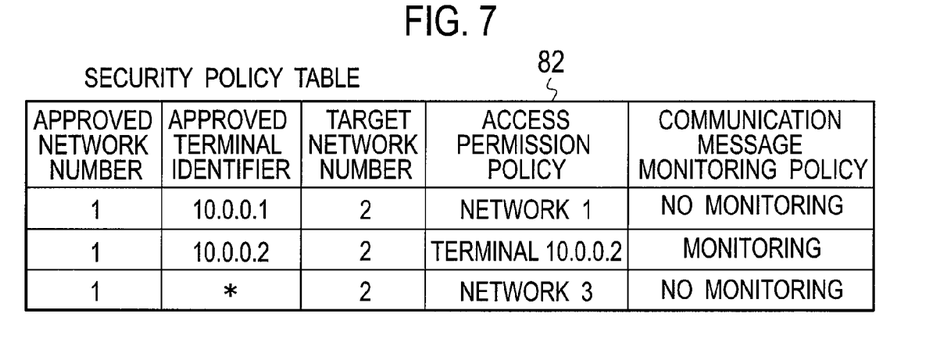
FIG. 7 is an example illustrating a security policy table used in the communication system according to the embodiment of the present invention.

For example, as shown in FIG. 7, the security policy storage unit 182 previously stores a security policy table 82 to be used for security settings.

The connection setting processing unit 15 implements a process regarding a connection setting with the brought-in terminal 3 on the basis of the connection request information table 81 stored in the connection request information storage unit 181 and the security policy table stored in the security policy storage unit 182. The connection setting processing unit 15 includes a connection request matching processing unit 151 and a security setting processing unit 152. The connection setting processing unit 15, the connection request matching processing unit 151 and the security setting processing unit 152 may be configured with the same hardware in a processing unit or different hardware.

The connection request matching processing unit 151 refers to the connection request information table 81 stored in the connection request information storage unit 181 and determines whether or not the connection request information transmitted by the home terminal 2 and the connection request information transmitted by the brought-in terminal 3 form a combination under a predetermined condition.

Figure 8:
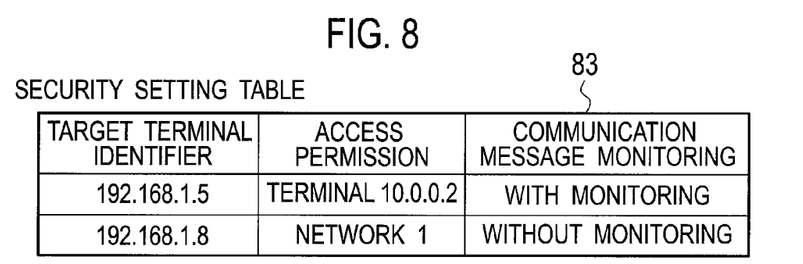
FIG. 8 is an example illustrating a security setting table used in the communication system according to the embodiment of the present invention.
Figure 9:
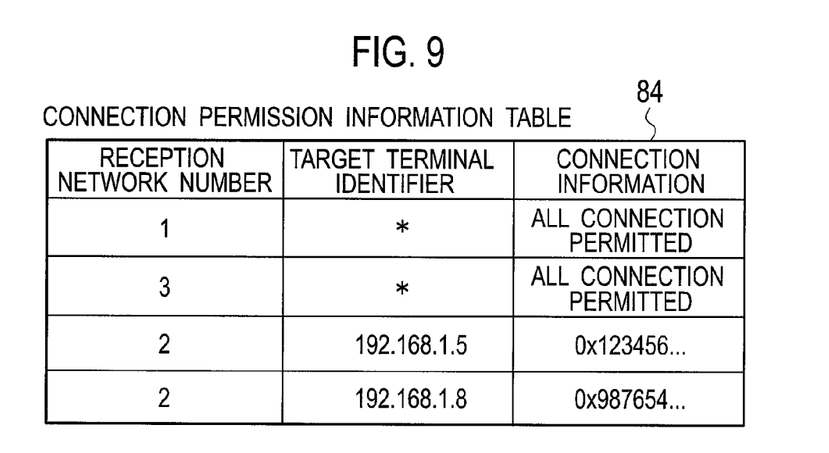
FIG. 9 is an example illustrating a connection permission information table used in the communication system according to the embodiment of the present invention.

The security setting processing unit 152 determines a security setting for the home terminal 2 and the brought-in terminal 3 which have transmitted two pieces of connection request information in the combination selected by the connection request matching processing unit 151 on the basis of the security policy table 82. For example, as shown in FIG. 8, the security setting processing unit 152 makes the security setting storage unit 183 store the determined security setting in a security setting table 83. Moreover, the security setting processing unit 152 makes the connection permission information storage unit 184 store connection information and the like necessary for the connection setting, for example, in a connection permission information table 84 as shown in FIG. 9.

The connection setting processing unit 15 generates a connection permission message including connection information for the connection setting between the relay device 1 and the brought-in terminal 3 depending on the determination result of the connection request matching processing unit 151, and transmits the generated connection permission message to the brought-in terminal 3.

Figure 10:
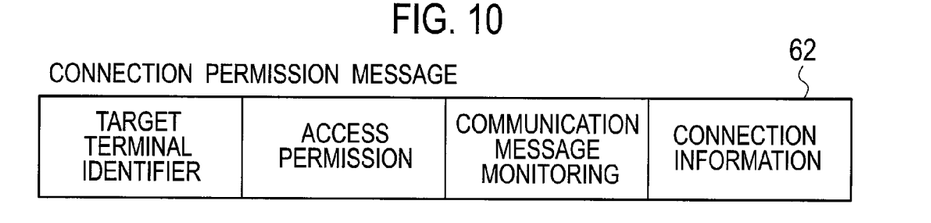
FIG. 10 is an example illustrating a data structure of a connection permission message used in the communication system according to the embodiment of the present invention.

The connection setting processing unit 15 generates the connection permission message for the brought-in terminal 3 on the basis of the connection permission information table 84 stored in the connection permission information storage unit 184 and the security setting table 83 stored in the security setting storage unit 183. For example, as shown in FIG. 10, the connection setting processing unit 15 generates a connection permission message 62, which includes connection information in the connection permission information table 84 and a security setting in the security setting table 83, and transmits the generated connection permission message to the brought-in terminal 3 and another relay device 1.

The connection information is information necessary for the connection setting between the brought-in terminal 3 and the relay device 1 in order that the brought-in terminal 3 communicates with another communication terminal or an outside network. For example, an encryption key for encrypting a communication message, a network address of the relay device 1, or the like is adoptable for the connection information.

The connection permission reception processing unit 14 obtains a connection permission message 62 transmitted by another relay device 1 and received by the communication unit 11, and stores the obtained connection permission message in the connection permission information storage unit 184.

The connection permission confirmation processing unit 17 obtains a communication message transmitted by the brought-in terminal 3 and received by the communication unit 11. The connection permission confirmation processing unit 17 determines whether or not the obtained communication message is one transmitted from a communication terminal for which connection permission is given on the basis of the connection permission information table 84.

The routing processing unit 16 forwards the communication message, which is determined by the connection permission confirmation processing unit 17 to have connection permission, to a destination on the basis of the security setting storage unit 183.

(Operations of Communication System)

Figure 11:
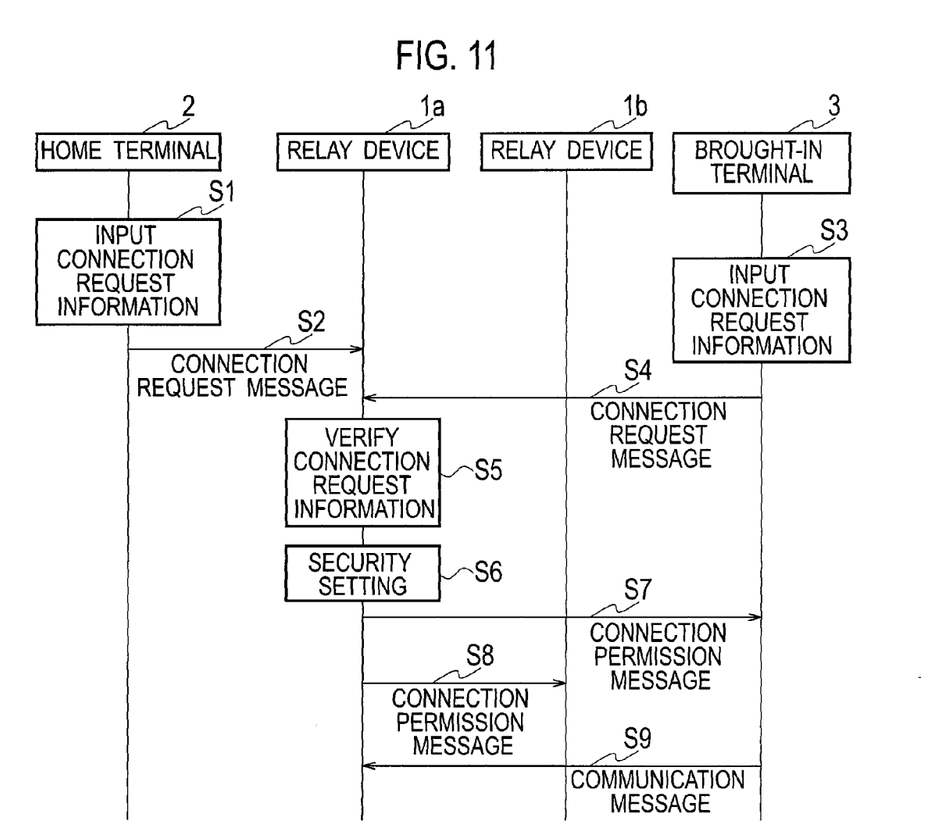
FIG. 11 is a sequence diagram explaining an outline of operations of the communication system according to the embodiment of the present invention.

Using a sequence diagram shown in FIG. 11 and referring to flow charts shown in FIGS. 12 to 18, an explanation will be given for an example of operations for a connection setting for the brought-in terminal 3 in the communication system according to the embodiment of the present invention.

Figure 12:
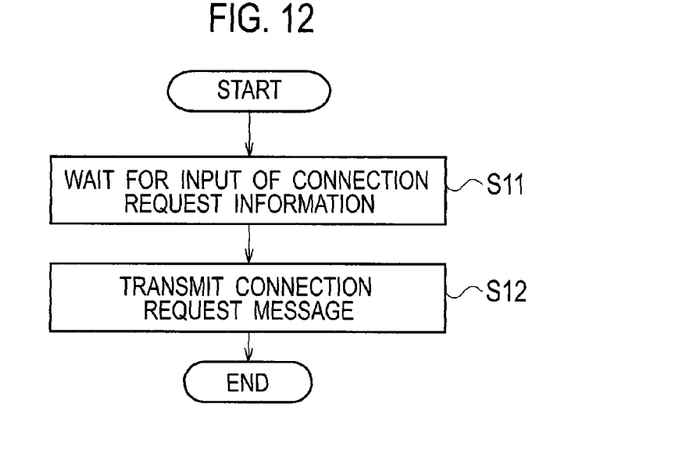
FIG. 12 is a flowchart explaining operations of a connection request process by the home terminal included in the communication system according to the embodiment of the present invention.

First, at a step S1, the connection request input unit 21 of the home terminal 2 receives an input of connection request information through an operation by a user A (step S11 in FIG. 12). The connection request transmission processing unit 22 obtains the connection request information which is input to the connection request input unit 21, and generates a connection request message 61 including the obtained connection request information.

At a step S2, the connection request transmission processing unit 22 makes the communication unit 23 transmit the generated connection request message 61 to the relay device 1a (step S12 in FIG. 12).

When the communication unit 11 of the relay device 1a receives the connection request message 61 from the home terminal 2 (step S31 in FIG. 14), the connection request reception processing unit 12 obtains the connection request message 61 and a network number corresponding to a network which has received the connection request message 61. The connection request reception processing unit 12 stores the obtained connection request message 61 and the network number in the connection request information table 81 (step S32 in FIG. 14). The network number may be, for example, a group identifier in a case where communication terminals on a network are divided into some groups in accordance with a predetermined method.

The connection request information table 81 in FIG. 6 illustrates a case where time stamps of pressing a button by users are adopted as connection request information. When the terminal identifier of the home terminal 2 is "10.0.0.2" and the network number of a network to which the home terminal 2 is connected is "1", they are stored in the connection request information table 81 as in the first line in FIG. 6.

Figure 13:
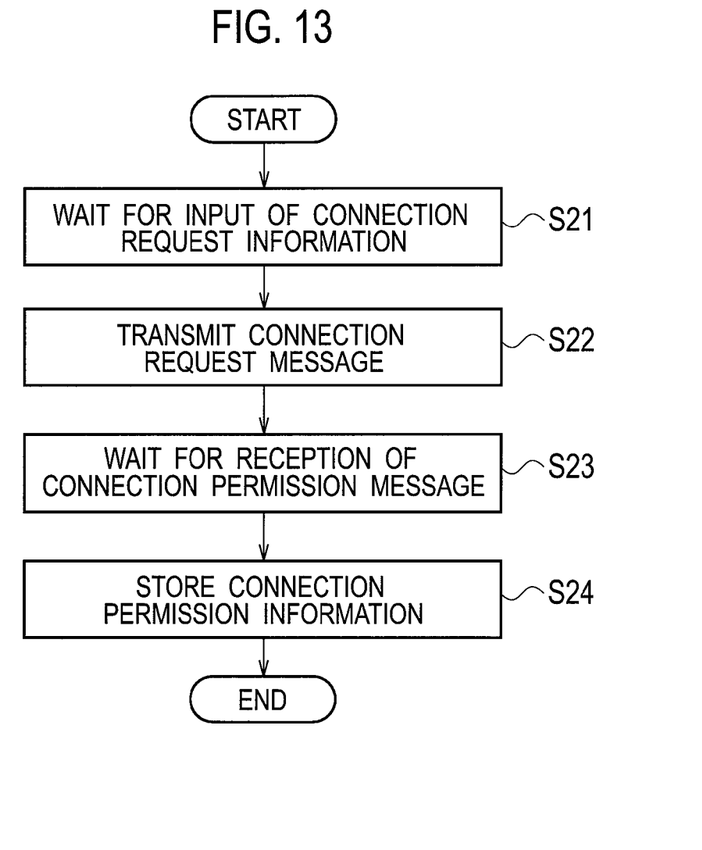
FIG. 13 is a flowchart explaining operations of a connection request process by the brought-in terminal included in the communication system according to the embodiment of the present invention.
Figure 14:
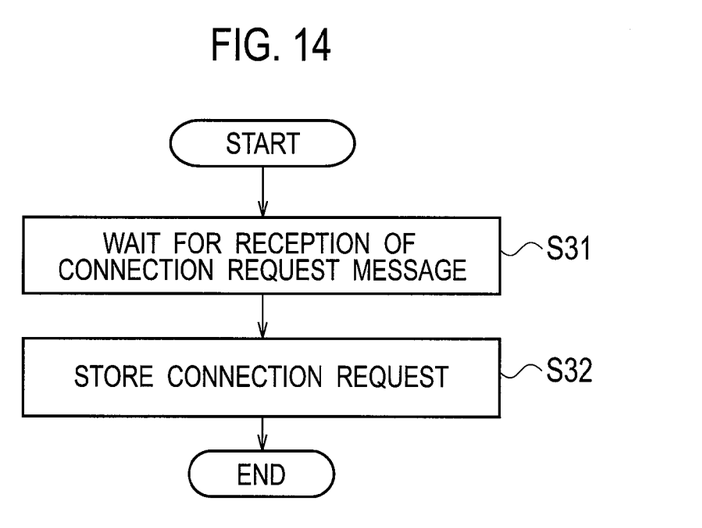
FIG. 14 is a flowchart explaining operations of a connection request reception process by the relay device included in the communication system according to the embodiment of the present invention.

At a step S3, the connection request input unit 31 of the brought-in terminal 3 receives an input of connection request information through an operation by a user B (step S21 in FIG. 13). The connection request transmission processing unit 32 obtains the connection request information which is input to the connection request input unit 31, and generates a connection request message 61 including the obtained connection request information.

At a step S4, the connection request transmission processing unit 32 makes the communication unit 33 transmit the generated connection request message 61 to the relay device 1a (step S22 in FIG. 13).

When the communication unit 11 of the relay device 1a receives the connection request message 61 from the brought-in terminal 3 (step S31 in FIG. 14), the connection request reception processing unit 12 obtains the connection request message 61 and a network number corresponding to a network which has received the connection request message 61. The connection request reception processing unit 12 stores the obtained connection request message 61 and the network number in the connection request information table 81 (step S32 in FIG. 14).

Figure 15:
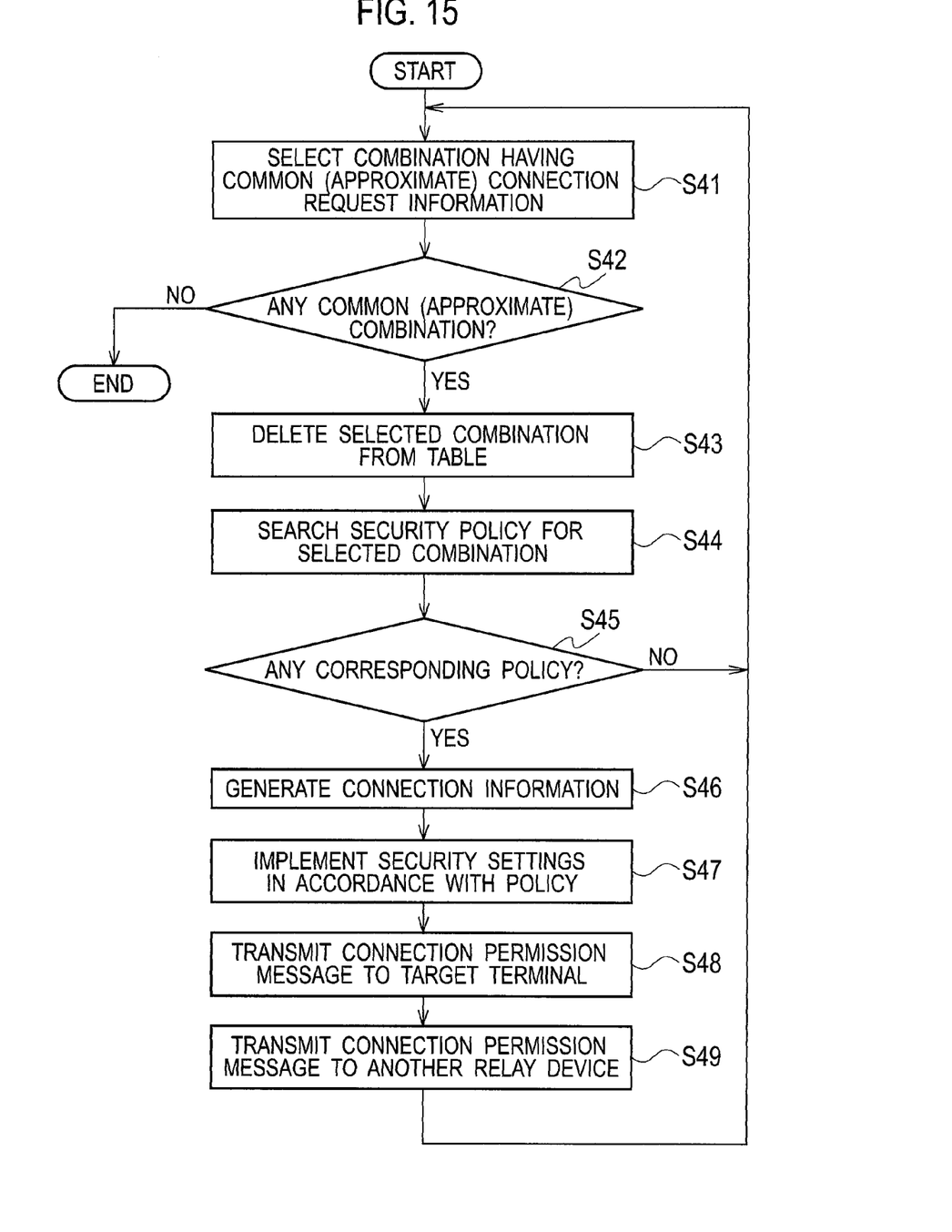
FIG. 15 is a flowchart explaining operations of a connection request matching process by the relay device included in the communication system according to the embodiment of the present invention.

At a step S5, the connection request matching processing unit 151 of the relay device 1a verifies combinations of two pieces of connection request information stored in the connection request information table 81, and selects a combination of two pieces of connection request information, which is formed under a predetermined condition (step S41 in FIG. 15).

The connection request information table 81 in FIG. 6 illustrates a case where a timing (time stamp) of pressing a button on a communication terminal by a user as connection request information is adopted as a connection request. In this case, the connection request matching processing unit 151 selects a combination of two pieces of connection request information from the connection request information table 81, which have, for example, approximate time stamps of pressing a button within a predetermined time period. When personal identification numbers or the like are adopted as connection request information, the connection request matching processing unit has only to select a combination having identical connection request information.

When a combination which has two pieces of connection request information satisfying the predetermined condition is not selected, the connection request matching processing unit 151 finishes the process (step S42 in FIG. 15). When a combination which has two pieces of connection request information satisfying the predetermined condition is selected, the connection request matching processing unit 151 deletes data of the two pieces of connection request information in the combination from the connection request information table 81 (step S43 in FIG. 15).

At a step S6, the security setting processing unit 152 determines a security setting for controlling communications, such as an access control, for the brought-in terminal 3 on the basis of the security policy table 82.

First, the security setting processing unit 152 of the relay device 1a refers to the security policy table 82 which is previously stored in the security policy storage unit 182, and searches and specifies a security policy corresponding to the selected combination (step S44 in FIG. 15).

For example, the terminal identifier of the home terminal 2 is "10.0.0.2" and the terminal identifier of the brought-in terminal 3 is "192.168.1.5". In the connection request information table 81 shown in FIG. 6, the first line shows data of connection request information regarding the home terminal 2 and the second line shows data of connection request information regarding the brought-in terminal 3. In view of a column of approved network number and a column of approved terminal identifier in the security policy table 82 in FIG. 7, "10.0.0.2" of the home terminal 2 and "1" of the reception network number correspond to a security policy in the second line. Moreover, a target network number "2" of the security policy in the second line is coincide with the reception network number "2" in the connection request of the brought-in terminal 3. As described above, it is determined that the security policy in the second line in FIG. 7 corresponds to the selected combination of two pieces of connection request information. Incidentally, the mark "*" in the third line in FIG. 7 means corresponding to all terminal identifiers.

The security setting processing unit 152 of the relay device 1a determines whether or not a security policy corresponding to the selected combination of two pieces of connection request information is identified in the security policy table 82 (step S45 in FIG. 15). If no security policy corresponding to the selected combination of two pieces of connection request information is identified in the security policy table 82, the security setting processing unit 152 goes back to the process in the step S41 in FIG. 15, again. If a corresponding security policy is identified, the security setting processing unit 152 proceeds to a process at a step S46 in FIG. 15.

The security setting processing unit 152 generates connection information for the brought-in terminal 3, and stores with the terminal identifier of the brought-in terminal 3 and the network number showing a group to which the brought-in terminal 3 is connected, in the connection permission information table 84 (step S46 in FIG. 15). For example, the terminal identifier of the brought-in terminal 3 is "192.168.1.5", the network number is "2", and the generated connection information (encryption key) is "0x 123456 . . .". In this case, the security setting processing unit 152 stores the connection permission information in the connection permission information table 84 as in the third line in FIG. 9.

Next, the connection request matching processing unit 151 stores a security setting in the security setting table 83 in accordance with the security policy identified at the step S44 in FIG. 15 (step S47 in FIG. 15).

For example, the terminal identifier of the home terminal 2 is "10.0.0.2" and the network number is "1", and the terminal identifier of the brought-in terminal 3 is "192.168.1.5" and the network number is "2". Also, the combination of two pieces of connection request information identified at the step S44 in FIG. 15 corresponds to the security policy in the second line in FIG. 7, which is of the home terminal 2 and the brought-in terminal 3. In this case, from an approved terminal identifier "10.0.0.2" in the security policy in the second line of FIG. 7, the security setting processing unit 152 considers the home terminal 2, which is one of the combination, as the approved terminal, and the brought-in terminal 3, which is the other of the combination, as a target for implementing the security setting. The security setting processing unit 152 stores the terminal identifier "192.168.1.5" of the brought-in terminal 3 in a security setting in the security setting table 83 as a target terminal identifier. Also, an access permission policy "10.0.0.2" in the security policy in the second line of FIG. 7 is stored as access permission in the security setting of the security setting table 83. Similarly, a communication message monitoring policy "monitoring" is stored as a communication message monitoring in the security setting in the security setting table 83. As described above, the security setting processing unit 152 stores the security setting in the first line in FIG. 8 in the security setting table 83 and implements the security setting for the brought-in terminal 3.

At a step S7, the connection setting processing unit of the relay device 1a generates a connection permission message and transmits the generated connection permission message to the brought-in terminal 3. As shown in FIG. 10, the connection setting processing unit 15 of the relay device 1a generates a connection permission message 62 including the connection information generated at the step S46 in FIG. 15 and the security setting set at the step S47 in FIG. 15. The security setting processing unit 152 transmits the generated connection permission message 62 to the brought-in terminal 3 through the communication unit 11 (step S48 in FIG. 15).

When the communication unit 33 of the brought-in terminal 3 receives the connection permission message 62 transmitted by the communication unit 11 of the relay device 1a, the connection permission reception processing unit 34 obtains the connection permission message 62 from the communication unit 33 (step S23 in FIG. 13). The connection permission reception processing unit 34 stores the content of the connection permission message 62 in the connection permission information table in the connection permission information storage unit 35 (step S24 in FIG. 13).

At a step S8, the relay device 1a transmits the connection permission message 62, which includes the connection information generated at the step S46 in FIG. 15 and the security setting set at the step S47 in FIG. 15, to another relay device 1b. That is, the connection setting processing unit 15 of the relay device 1a transmits the connection permission message 62 to the relay device 1b through the communication unit 11 (step S49 in FIG. 15).

Figure 16:
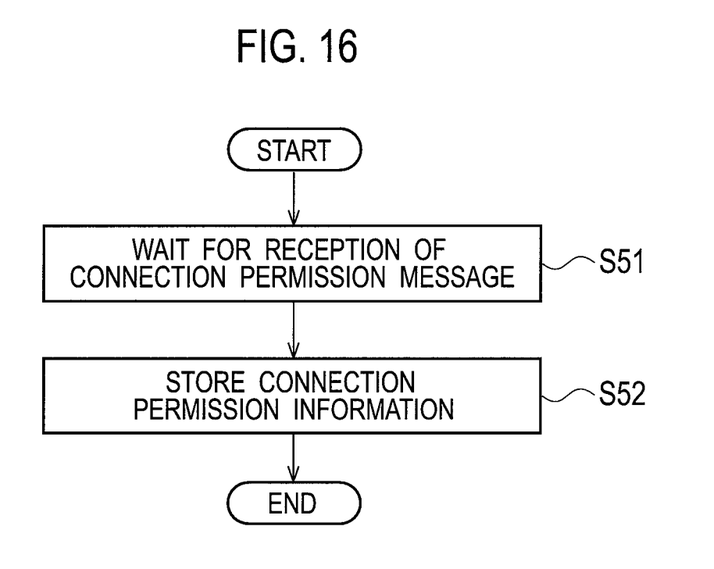
FIG. 16 is a flowchart explaining operations of a connection permission reception process by the relay device included in the communication system according to the embodiment of the present invention.
Figure 17:
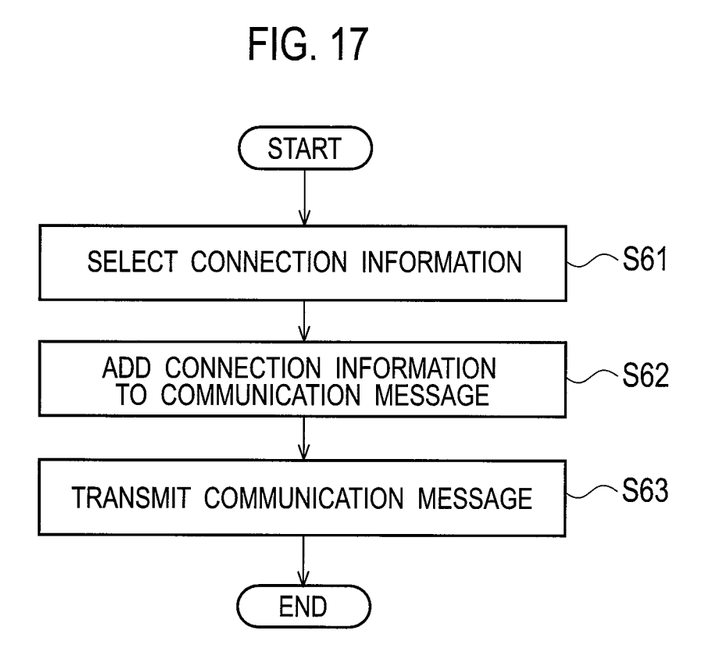
FIG. 17 is a flowchart explaining operations of a communication message transmission process by the brought-in terminal included in the communication system according to the embodiment of the present invention.

When the communication unit 11 of another relay device 1b receives the connection permission message 62 transmitted by the relay device 1a, the connection permission reception processing unit 14 of the relay device 1b obtains the connection permission message 62 from the communication unit 11 (step S51 in FIG. 16). The connection permission reception processing unit 14 stores the content of the connection permission message 62 in the connection permission information storage unit 184 (step S52 in FIG. 16).

As described above, the connection setting process by the connection setting processing unit 15 for the brought-in terminal 3 is finished. Thereby, the brought-in terminal 3 is allowed to communicate with another communication terminal or an outside network through the relay device 1.

At a step S9, the brought-in terminal 3 transmits a communication message, which is addressed to another communication terminal or an outside network, to the relay device 1.

First, the communication message transmission processing unit 36 of the brought-in terminal 3 generates a communication message including an address of an arbitrary communication terminal or a server on the Internet 5, which is a destination thereof. The communication message transmission processing unit 36 refers to target terminal identifiers in the connection permission information table in the connection permission information storage unit 35 and selects data of connection permission information corresponding to the terminal identifier of the brought-in terminal 3 (step S61 in FIG. 17). The communication message transmission processing unit 36 adds connection information, which is included in the connection permission information selected at the step S61, to the generated communication message (step S62 in FIG. 17). Moreover, in a case of employing an encryption key as connection information, for example, the communication message transmission processing unit 36 is capable of encrypting the communication message by use of the encryption key which is the connection information. The communication message transmission processing unit 36 transmits the communication message, to which the connection information is added, through the communication unit 33 to the relay device 1 (step S63 in FIG. 17).

Figure 18:
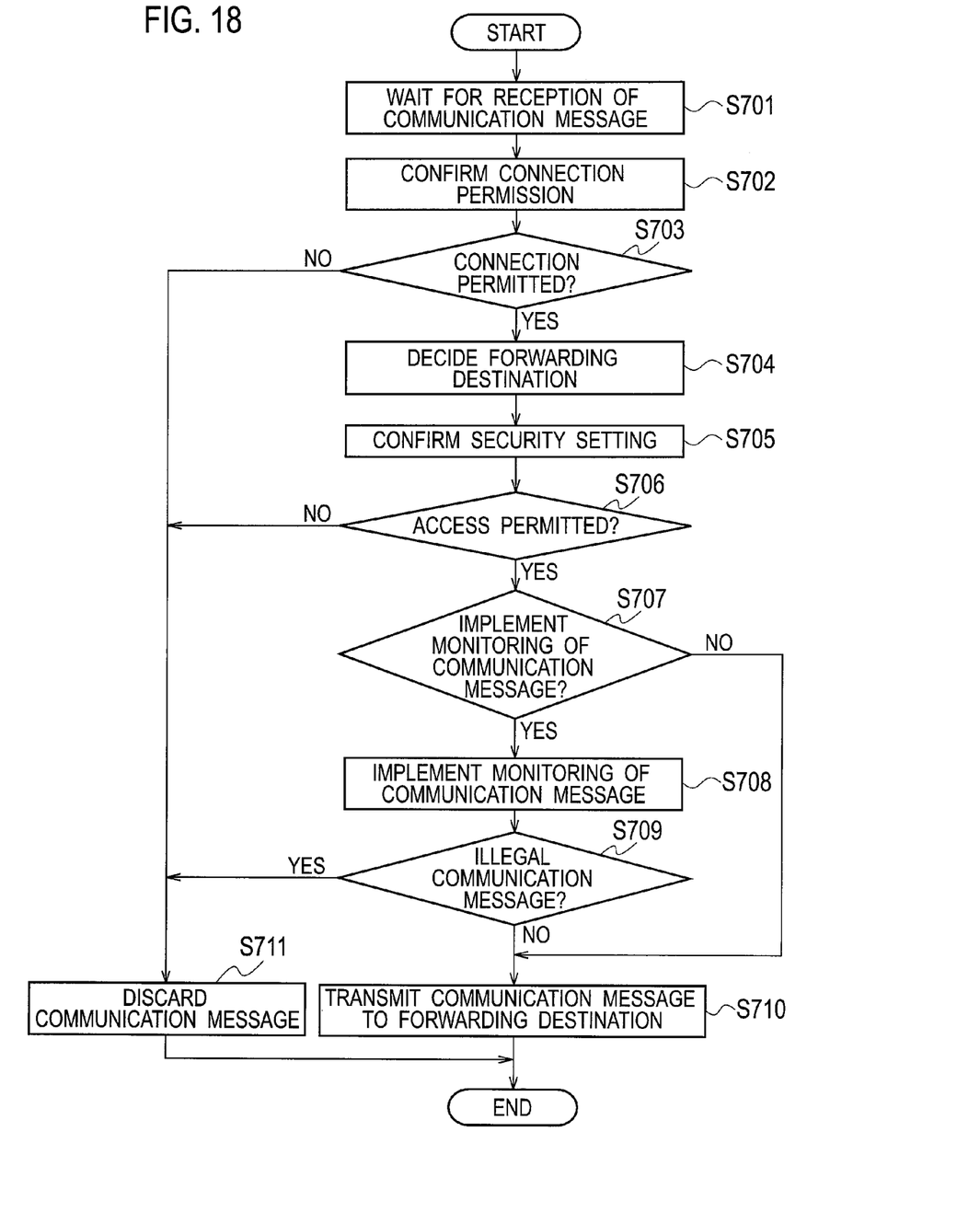
FIG. 18 is a flowchart explaining operations of a routing process by the relay device included in the communication system according to the embodiment of the present invention.

When the communication unit 11 of the relay device 1 receives the communication message from the brought-in terminal 3, the connection permission confirmation processing unit 17 obtains the communication message from the communication unit 11 (step S701 in FIG. 18).

Obtaining the communication message, the connection permission confirmation processing unit 17 refers to the connection permission information table 84 in the connection permission information storage unit 184, and selects data of connection permission information corresponding to the terminal identifier of the brought-in terminal 3, which is the transmission source of the communication message. The connection permission confirmation processing unit 17 confirms whether or not the communication message is given connection permission using the connection information of the selected connection permission information (step S702 in FIG. 18).

For example, when the connection information is an encryption key, the connection permission confirmation processing unit 17 tries to decrypt the encrypted communication message by use of the encryption key which is the connection information. The connection permission confirmation processing unit 17 confirms that the connection is permitted if the encrypted communication message is decrypted, while the connection permission confirmation processing unit 17 is not able to confirm that the connection is permitted if the decryption is failed. When the connection information is a network address of the relay device 1 or the like, the connection permission confirmation processing unit 17 confirms that the connection is permitted when the connection information corresponds to the network address of the relay device 1.

The connection permission confirmation processing unit 17 determines whether or not the connection permission is confirmed at the step S702 (step S703 in FIG. 18). At the step S703, if the connection permission is not confirmed, the connection permission confirmation processing unit 17 discards the communication message and finishes the process (step S711 in FIG. 18). If the connection permission is confirmed, the connection permission confirmation processing unit 17 transmits the communication message to the routing processing unit 16 and goes to a step S704.

The routing processing unit 16 controls the communication of the brought-in terminal 3 in accordance with the security setting determined by the security setting processing unit 152. The routing processing unit determines a network number of the forwarding destination of the communication message and a terminal identifier of the forwarding destination depending on the address of the communication message obtained from the connection permission confirmation processing unit 17 (step S704 in FIG. 18). The process at the step S704 may be implemented by the routing processing unit 16, for example, by referring to a previously set routing table. The routing table may be data in a table form, in which a network number showing a group of networks for forwarding and a terminal identifier of a forwarding destination are set according to a destination of a communication message, for example.

The routing processing unit 16 refers to target terminal identifiers in the security setting table 83 and selects data of security setting corresponding to the terminal identifier of the transmission source of the communication message (step S705 in FIG. 18).

The routing processing unit 16 refers to access permission of the selected security setting and determines whether or not the access is permitted for the forwarding destination (network number and terminal identifier) determined at the step S704 (step S706 in FIG. 18). If the access is not permitted, the communication message is discarded and the process is finished (step S711 in FIG. 18).

If the access is permitted, the routing processing unit 16 refers to the communication message monitoring of the security setting selected at the step S705 and determines whether or not to monitor the communication message (step S707 in FIG. 18). If the setting of communication message monitoring is "no monitoring", the routing processing unit 16 transmits the communication message to the forwarding destination without implementing the communication message monitoring process (step S710 in FIG. 18). If the setting of communication message monitoring is "monitoring", the routing processing unit 16 implements the communication message monitoring process (step S708 in FIG. 18) and determines whether or not it is an illegal communication message (step S709 in FIG. 18).

If the monitored communication message is an illegal communication message, the routing processing unit 16 discards the communication message and finishes the process (step S711 in FIG. 18). If the monitored communication message is not an illegal communication message, the routing processing unit 16 transmits the communication message to the forwarding destination (step S710 in FIG. 18). The communication message monitoring process may be implemented by, for example, previously setting an illegal message table and referring to the table in which a communication message such as one improperly using a security hole of a terminal is set.

According to the communication system of the embodiment of the present invention, since the connection setting for the second communication terminal is performed on the basis of the first connection request information transmitted by the first communication terminal and the second connection request information transmitted by the second communication terminal, there is no need of operating the relay devices and the connection setting is easy.

(Other Embodiments)

Although the embodiment of the present invention is described as above, a description or a drawing, which comprises a part of the disclosure, should not be understood as one limiting the present invention. Various alternative embodiments, examples and operating techniques will be obvious from the disclosure for those skilled in the art.

The order of steps may be changed and a step may be omitted.

As described above, the present invention of course includes various embodiments and the like, which are not described here, such as configurations making use of the embodiment of the present invention. The technical range of the present invention is therefore only determined by the elements specifying the invention, which are appropriate from the above explanation, according to the scope of claims.

The entire contents of Japanese Patent Application No. 2011-094289 (filing date: Apr. 20, 2011) are incorporated by reference herein.

REFERENCE SIGNS LIST 1, 1a, 1b Relay device
2 Home terminal
3 Brought-in terminal
4 Wired Local Area Network
5 Internet
11, 23, 33 Communication unit
12 Connection request reception processing unit
13 Transmission processing unit 14 Connection permission reception processing unit
15 Connection setting processing unit
16 Routing processing unit
17 Connection permission confirmation processing unit
21, 31 Connection request input unit
22, 32 Connection request transmission processing unit
34 Connection permission reception processing unit
35 Connection permission information storage unit
36 Communication message transmission processing unit
61 Connection request message
βConnection permission message
81 Connection request information table
82 Security policy table
83 Security setting table
84 Connection permission information table
111 Wired port
112 Wireless port
151 Connection request matching processing unit
152 Security setting processing unit
181 Connection request information storage unit
182 Security policy storage unit
183 Security setting storage unit
184 Connection permission information storage unit

The invention claimed is:

1. A relay device which communicates with a first communication terminal and a second communication terminal, and relays a communication between an outer network and each of the first communication terminal and the second communication terminal, the relay device comprising:
    a connection request information reception processing unit that obtains first connection request information transmitted by the first communication terminal and second connection request information transmitted by the second communication terminal;
    a connection request matching processing unit that determines whether or not the first connection request information and the second connection request information obtained by the connection request information reception processing unit form a combination of two corresponding connection requests under a predetermined condition by obtaining a group identifier on a network to which the first communication terminal is connected and a group identifier on a network to which the second communication terminal is connected, respectively, from the first connection request and the second connection request; and
    a connection setting processing unit that generates a connection permission message, which includes connection information for a connection setting with the second communication terminal, in the case where it is determined that the first connection request information and the second connection request information obtained by the connection request information reception processing unit form the combination of two corresponding connection requests under the predetermined condition, by means of a determination result by the connection request matching processing unit and transmits the connection permission message to the second communication terminal.

2. The relay device according to claim 1, further comprising:
    a security setting processing unit that determines a security setting, which is for controlling communications, regarding a communication message transmitted by the second communication terminal; and
    a routing processing unit that controls communications in accordance with the security setting determined by the security setting processing unit.

3. The relay device according to claim 2, wherein the routing processing unit monitors the communication message transmitted by the second communication terminal and determines whether or not the communication message is an illegal communication message.

4. The relay device according to claim 1, further comprising:
    a connection permission information storage unit that stores the connection permission message generated by the connection setting processing unit;
    a connection permission confirmation processing unit that refers to the connection permission information storage unit regarding the communication message transmitted by the second communication terminal and determines whether or not the second communication terminal is permitted to connect; and
    a connection permission reception processing unit that when receiving a connection permission message from another relay device, which is a relay device that relays a communication between the outer network and each of the first communication terminal and the second communication terminal, stores the connection permission message received from another relay device in the connection permission information storage unit.

5. The relay device according to claim 4, further comprising:
    a security setting processing unit that determines a security setting, which is for controlling communications, regarding a communication message transmitted by the second communication terminal; and
    a routing processing unit that controls communications in accordance with the security setting determined by the security setting processing unit,
    wherein the connection setting processing unit causes the security setting determined by the security setting processing unit to be included in the connection permission message, and
    the routing processing unit controls communications in accordance with the security setting stored in the connection permission information storage unit.

* * * * *